(12) United States Patent
Mullins et al.

(10) Patent No.: US 11,373,357 B2
(45) Date of Patent: Jun. 28, 2022

(54) ADJUSTING DEPTH OF AUGMENTED REALITY CONTENT ON A HEADS UP DISPLAY

(71) Applicant: Envisics Ltd, Knowlhill (GB)

(72) Inventors: Brian Mullins, Altadena, CA (US); Jamieson Christmas, Knowlhill (GB)

(73) Assignee: ENVISICS LTD, Milton Keynes (GB)

( * ) Notice: Subject to any disclaimer, the term of this patent is extended or adjusted under 35 U.S.C. 154(b) by 0 days.

(21) Appl. No.: 17/222,656

(22) Filed: Apr. 5, 2021

(65) Prior Publication Data

US 2021/0225063 A1 Jul. 22, 2021

Related U.S. Application Data

(63) Continuation of application No. 16/505,963, filed on Jul. 9, 2019, now Pat. No. 10,984,580, which is a (Continued)

(51) Int. Cl.
*G06T 15/02* (2011.01)
*B60R 1/00* (2022.01)
(Continued)

(52) U.S. Cl.
CPC ............... *G06T 15/02* (2013.01); *B60R 1/00* (2013.01); *G06T 3/4092* (2013.01);
(Continued)

(58) Field of Classification Search
None
See application file for complete search history.

(56) References Cited

U.S. PATENT DOCUMENTS 10,002,462 B2 6/2018 Seo
10,347,030 B2 7/2019 Mullins
(Continued)

FOREIGN PATENT DOCUMENTS

GB 2526275 A 11/2015
GB 2554575 A 4/2018
(Continued)

OTHER PUBLICATIONS

Co-Pending U.S. Appl. No. 16/505,963, filed Jul. 9, 2019.

*Primary Examiner* — Talha M Nawaz
(74) *Attorney, Agent, or Firm* — McDonnell Boehnen Hulbert & Berghoff LLP

(57) ABSTRACT

Disclosed are systems, methods, and non-transitory computer-readable media for adjusting depth of AR content on HUD. A viewing device identifies, based on sensor data, a physical object visible through a transparent display of the vehicle. The sensor data indicates an initial distance of the physical object from the vehicle. The viewing device gathers virtual content corresponding to the physical object and generates an initial presentation of the virtual content based on the initial distance. The viewing device presents the initial presentation of the virtual content on the transparent display at a position on the transparent display corresponding to the physical object. The viewing device determines, based on updated sensor data, an updated distance of the physical object and generates an updated presentation of the virtual content based on the updated distance. The viewing device presents the updated presentation of the virtual content on the transparent display of the vehicle.

21 Claims, 12 Drawing Sheets

Related U.S. Application Data continuation of application No. 15/595,666, filed on May 15, 2017, now Pat. No. 10,347,030.

(51) Int. Cl.
  *G06T 3/40* (2006.01)
  *G06T 19/00* (2011.01)
  *G06T 19/20* (2011.01)
  G06T 15/20 (2011.01)
  G06T 15/50 (2011.01)

(52) U.S. Cl.
  CPC ............ *G06T 19/006* (2013.01); *G06T 19/20* (2013.01); *B60R 2300/305* (2013.01); *B60R 2300/306* (2013.01); *G06T 15/20* (2013.01); *G06T 15/503* (2013.01); *G06T 2210/62* (2013.01)

(56) References Cited

U.S. PATENT DOCUMENTS

| | | | |
|---|---|---|---|
| 11,258,603 B2* | 2/2022 | Sunkavally | G06Q 10/0635 |
| 2003/0090752 A1 | 5/2003 | Rosenberger | |
| 2006/0279820 A1 | 12/2006 | Riley | |
| 2010/0332120 A1 | 12/2010 | Tomobe | |
| 2011/0254916 A1 | 10/2011 | Fan et al. | |
| 2013/0010103 A1 | 1/2013 | Ihara | |
| 2013/0265622 A1 | 10/2013 | Christmas et al. | |
| 2014/0022526 A1 | 1/2014 | Van Eijk et al. | |
| 2014/0152774 A1 | 6/2014 | Wakabayashi | |
| 2014/0232871 A1 | 8/2014 | Kriel | |
| 2014/0253987 A1 | 9/2014 | Christmas | |
| 2014/0292810 A1 | 10/2014 | Tsurumi | |
| 2015/0009695 A1 | 1/2015 | Christmas et al. | |
| 2015/0022526 A1 | 1/2015 | Christmas | |
| 2015/0294570 A1 | 10/2015 | Emura | |
| 2015/0321606 A1 | 11/2015 | Vartanian | |
| 2015/0346491 A1 | 12/2015 | Christmas et al. | |
| 2016/0152184 A1 | 6/2016 | Ogawa | |
| 2016/0170966 A1 | 6/2016 | Frank | |
| 2016/0199935 A1 | 7/2016 | Chen | |
| 2016/0224803 A1 | 8/2016 | Frank | |
| 2016/0300252 A1 | 10/2016 | Frank | |
| 2017/0082855 A1 | 3/2017 | Christmas et al. | |
| 2017/0085867 A1* | 3/2017 | Baran | H04N 13/122 |
| 2017/0115627 A1 | 4/2017 | Christmas et al. | |
| 2017/0192091 A1 | 7/2017 | Felix | |
| 2017/0253181 A1 | 9/2017 | Choi | |
| 2017/0322760 A1 | 11/2017 | Soh | |
| 2017/0330383 A1* | 11/2017 | van Laack | G06F 3/017 |
| 2017/0363869 A1 | 12/2017 | Christmas et al. | |
| 2018/0015672 A1 | 1/2018 | Shusteff | |
| 2018/0046138 A1 | 2/2018 | Christmas et al. | |
| 2018/0074497 A1 | 3/2018 | Tsuji | |
| 2018/0120768 A1 | 5/2018 | Christmas | |
| 2018/0181117 A1 | 6/2018 | Rosenburg | |
| 2018/0188532 A1 | 7/2018 | Christmas et al. | |
| 2018/0239152 A1 | 8/2018 | Kuo | |
| 2018/0272940 A1 | 9/2018 | Saeki | |
| 2018/0357495 A1 | 12/2018 | Watanabe | |
| 2019/0004476 A1 | 1/2019 | Mullins | |
| 2019/0005338 A1 | 1/2019 | Watanabe | |
| 2019/0014302 A1 | 1/2019 | Watanabe | |
| 2019/0026557 A1 | 1/2019 | Watanabe | |
| 2019/0041641 A1 | 2/2019 | Christmas et al. | |
| 2019/0064738 A1 | 2/2019 | Cole et al. | |
| 2020/0035012 A1 | 1/2020 | Mullins et al. | |
| 2020/0041957 A1 | 2/2020 | Mullins | |

FOREIGN PATENT DOCUMENTS

| | | | |
|---|---|---|---|
| GB | 2567409 A | 4/2019 | |
| GB | 2567410 A | 4/2019 | |
| GB | 2569206 A | 6/2019 | |
| GB | 2569208 A | 6/2019 | |
| WO | 2018078366 A1 | 5/2018 | |
| WO | 2018100394 A1 | 6/2018 | |
| WO | 2018100397 A1 | 6/2018 | |

* cited by examiner

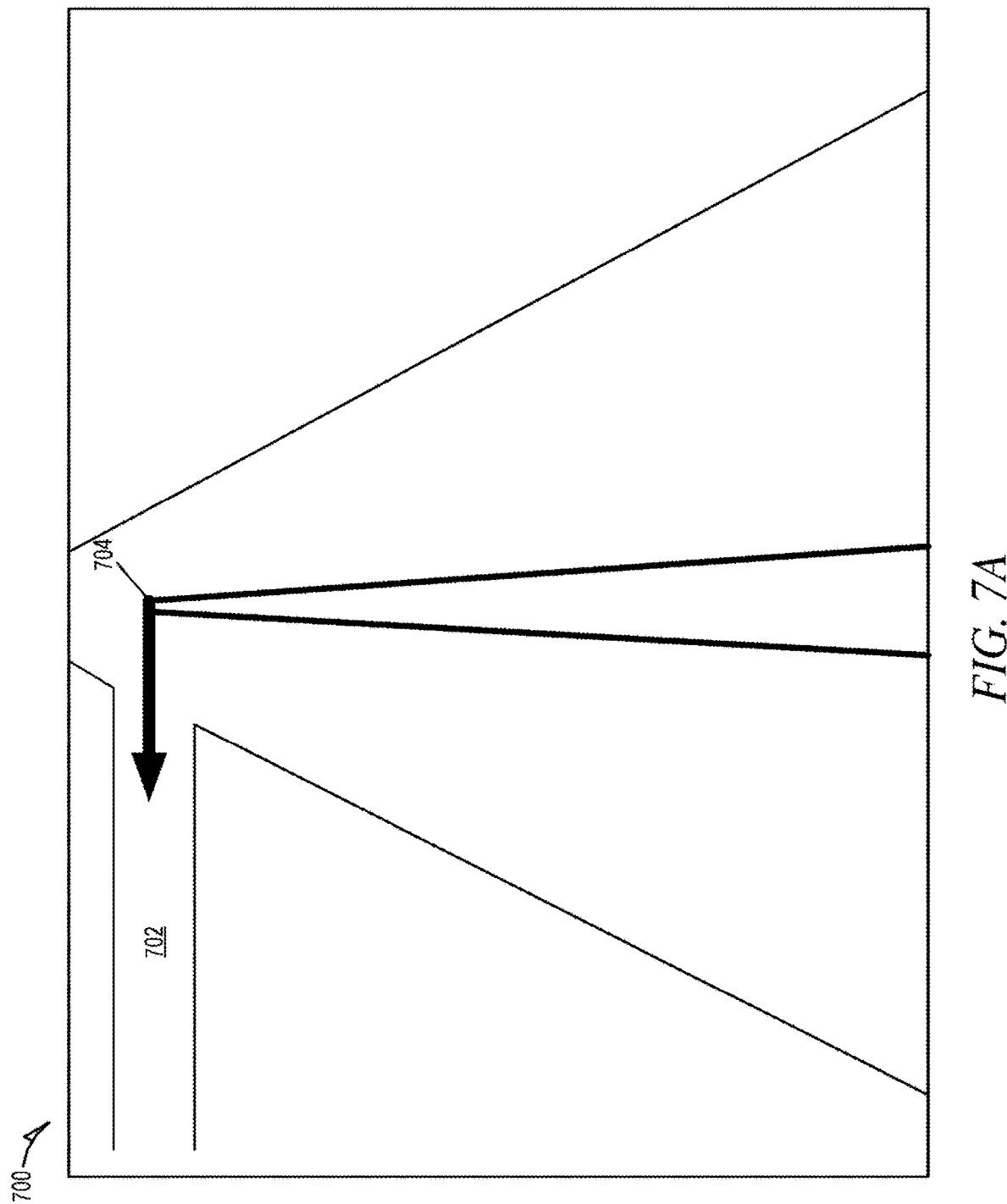

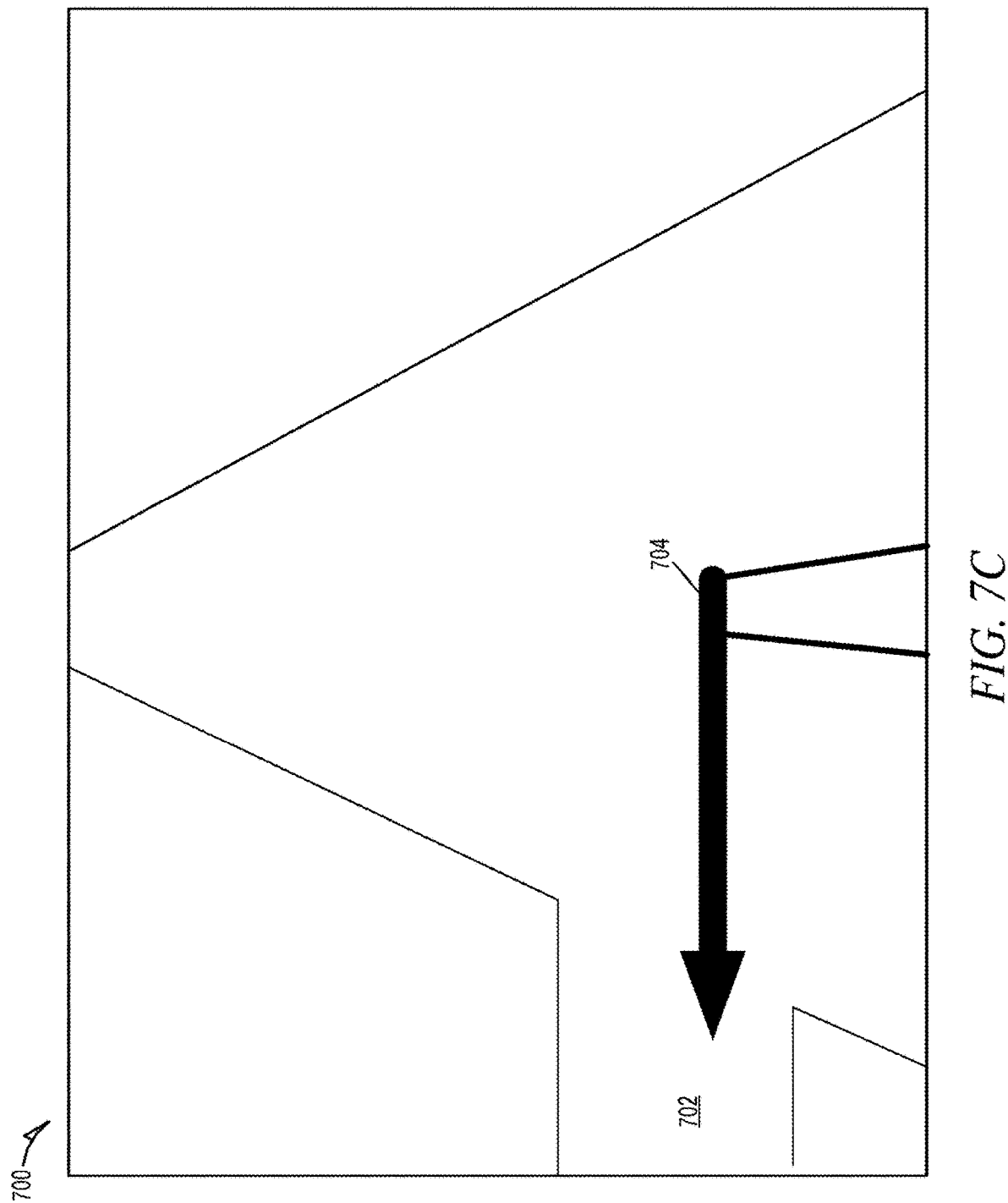

ADJUSTING DEPTH OF AUGMENTED REALITY CONTENT ON A HEADS UP DISPLAY

CROSS-REFERENCE TO RELATED APPLICATIONS

This application is a continuation of U.S. patent application Ser. No. 16/505,963, filed Jul. 9, 2019, which is a continuation of U.S. patent application Ser. No. 15/595,666, filed May 15, 2017, now U.S. Pat. No. 10,347,030, each of which is hereby incorporated herein by reference in its entirety.

BACKGROUND

The subject matter disclosed herein generally relates to presenting virtual content to augment reality. Specifically, the present disclosure addresses systems and methods for adjusting depth of augmented reality (AR) content on a heads up display (HUD).

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

AR systems present virtual content to augment the reality of a user. By way of educational background, another aspect of the prior art generally useful to be aware of is that a device can be used to generate and display data in addition to an image captured with the device. For example, conventional AR systems typically display graphical objects as virtual content to a screen or other display medium, wherein a user may visualize a real-world environment through the screen in addition to the graphical object displayed within the screen. With conventional AR systems, the user may view the graphical object at a fixed position with respect to the screen, wherein the rendering of the graphical object is fixed arbitrarily to a spatial pixel region of the screen.

BRIEF DESCRIPTION OF THE SEVERAL VIEWS OF THE DRAWINGS

Some embodiments, in accordance with the present invention, are illustrated by way of example, and not limitation, in the figures of the accompanying drawings.

FIG. 7A-7C illustrate screenshots of another exemplary HUD environment wherein virtual content may be displayed, in accordance with some example embodiments.

DETAILED DESCRIPTION

Figure 1:
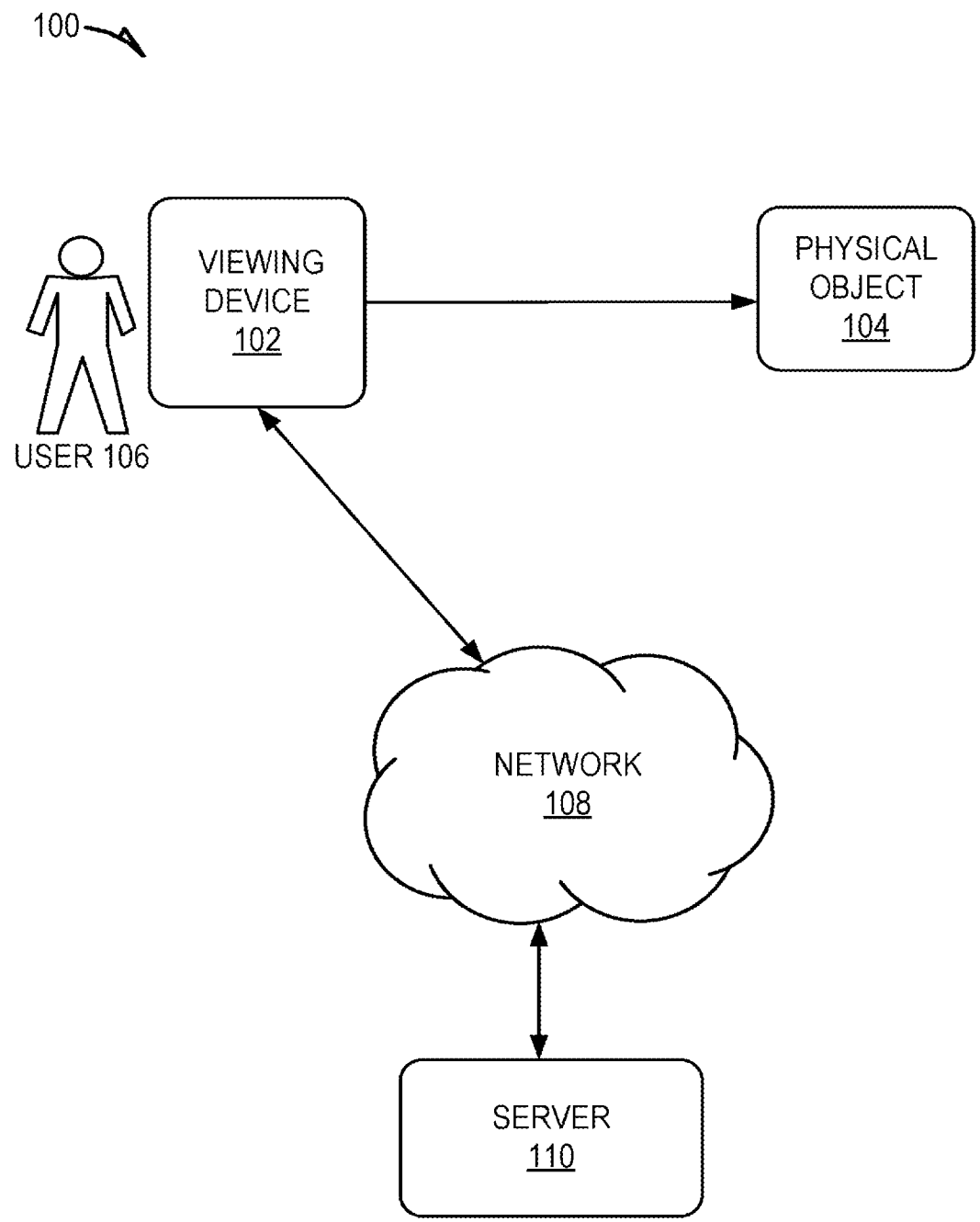
FIG. 1 illustrates a block diagram of an example of a network environment suitable for presenting virtual content to a user, in accordance with some example embodiments.

AR systems may be utilized in a multiplicity of instances. One exemplary use for AR is to aid users while operating a vehicle. For instance, virtual content may be presented on a HUD to provide a user with directions to a desired destination. Virtual arrows or other indicators may be presented on the HUD to augment the user's physical world and provide a route the user should follow to reach their desired destination. As another example, informational text may be presented on the HUD that describes nearby stores, vehicles, etc. While it is contemplated that AR provides valuable information, presenting information on a HUD presents challenges due to the continuously changing environment. The distances between the vehicle and surrounding objects change as the vehicle and/or the surrounding objects move.

Example methods and systems of adjusting depth of AR content on a HUD are disclosed. In the following description, for purposes of explanation, numerous specific details are set forth in order to provide a thorough understanding of example embodiments. It will be evident, however, to one skilled in the art that the present embodiments can be practiced without these specific details.

Many embodiments of the present invention exemplify methods and systems directed to adjusting depth of AR content on a HUD. Examples and embodiments merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

AR allows a user to augment reality with virtual content. Virtual content may be presented on a transparent display of a viewing device to augment the user's real world environment. As an example, virtual content presented on a HUD in an automobile can present the user with arrows, shapes, 3D objects, other indicators, and or other illustrations that may provide the user with directions to a desired destination, and/or other information with respect to the environment. As another example, virtual content describing vehicles and/or businesses can be presented on the HUD to provide a user with additional information regarding their environment.

To augment the reality of a user, virtual content may be presented on the HUD to create the appearance that the virtual content is present in the user's real world environment rather than just presented arbitrarily on a display. To properly create this appearance, a viewing device adjusts a rendering of the virtual content corresponding to a physical object based on a depth of a physical object from the vehicle. The depth of a physical object is based on the distance of the physical object from the vehicle. Thus, presentation of virtual content corresponding to a building will adjust as the building gets closer to the vehicle. For example, the virtual content can appear larger as the vehicle gets closer to the building, thereby creating the appearance that the virtual content is present in the user's real world environment. As another example, presentation of virtual content corresponding to a cross-street (e.g., a virtual arrow instructing a user to turn at the upcoming cross-street) will initially be presented according to the distance of the cross-street from the vehicle and be adjusted as the vehicle gets closer to the cross-street.

FIG. 1 illustrates a block diagram of an example of a network environment suitable for presenting virtual content to a user, in accordance with some example embodiments. The network environment 100 includes a viewing device 102 and a server 110, communicatively coupled to each other via a network 108. The viewing device 102 and the server 110 may each be implemented in a computer system, in whole or in part, as described below with respect to FIG. 8.

In some embodiments, the server 110 may be part of a network-based system. For example, the network-based system may be or include a cloud-based server system that provides additional information, such as three-dimensional (3D) models or other virtual content, to the viewing device 102.

The viewing device 102 can be used by the user 106 to augment the reality of a user 106. The user 106 may be a human user (e.g., a human being), a machine user (e.g., a computer configured by a software program to interact with the viewing device 102), or any suitable combination thereof (e.g., a human assisted by a machine or a machine supervised by a human). The user 106 is not part of the network environment 100, but is associated with the viewing device 102.

The viewing device 102 may be a computing device with a camera and a transparent display, such as a tablet, smartphone, or a wearable computing device (e.g., helmet or glasses). In another example embodiment, the viewing device 102 may be hand held or may be removably mounted to the head of the user 106 (e.g., a head-mounted viewing device). In the present embodiment, the viewing device 102 may be a computing device integrated in a vehicle, such as an automobile, to provide virtual content on a heads up display (HUD).

In one example, the display may be a screen that displays what is captured with a camera of the viewing device 102. In another example, the display of the viewing device 102 may be transparent or semi-transparent, such as in lenses of wearable computing glasses, the visor or a face shield of a helmet, or a windshield of a car. In this type of embodiment, the user 106 may simultaneously view virtual content presented on the display of the viewing device 102 as well as a physical object 104 in the user's 106 line of sight in the real-world physical environment.

The viewing device 102 may provide the user 106 with an augmented reality experience. For example, the viewing device 102 can present virtual content on the display of the viewing device 102 that the user 106 can view in addition to physical objects 104 that are in the line of sight of the user 106 in the real-world physical environment. Virtual content can be any type of image, animation, etc., presented on the display. For example, virtual content can include a virtual model (e.g., 3D model) of an object.

The viewing device 102 can present virtual content on the display to augment a physical object 104. For example, the viewing device 102 can present virtual content to create an illusion to the user 106 that the physical object 104 is changing colors, emitting lights, etc. As another example, the viewing device 102 can present virtual content on a physical object 104 that provides information about the physical object 104, such a presenting a name of a restaurant over the physical location of the restaurant. As another example, the viewing device can present arrows, lines, or other directional indicators over a street to provide the user 106 with directions to a desired destination.

The physical object 104 may include any type of identifiable objects such as a 2D physical object (e.g., a picture), a 3D physical object (e.g., a factory machine, table, cube, building, street, etc.), a location (e.g., at the bottom floor of a factory), or any references (e.g., perceived corners of walls or furniture) in the real-world physical environment.

The viewing device 102 can present virtual content in response to detecting one or more identified objects (e.g., physical object 104) in the physical environment. For example, the viewing device 102 may include optical sensors to capture images of the real-world physical environment and computer vision recognition to identify physical objects 104.

In one example embodiment, the viewing device 102 locally analyzes captured images using a local content dataset or any other dataset previously stored by the viewing device 102. The local content dataset may include a library of virtual content associated with real-world physical objects 104 or references. For example, the local content dataset can include image data depicting real-world physical objects 104, as well as metadata describing the real-world objects. The viewing device 102 can utilize the captured image of a physical object to search the local content dataset to identify the physical object and its corresponding virtual content.

In one example, the viewing device 102 can analyze an image of a physical object 104 to identify feature points of the physical object 104. The viewing device 102 can utilize the identified feature points to identify a corresponding real-world physical object from the local content dataset. The viewing device 102 may also identify tracking data related to the physical object 104 (e.g., GPS location of the viewing device 102, orientation, distance to the physical object 104).

If the captured image is not recognized locally by the viewing device 102, the viewing device 102 can download additional information (e.g., virtual content) corresponding to the captured image, from a database of the server 110 over the network 108.

In another example embodiment, the physical object 104 in the image is tracked and recognized remotely at the server 110 using a remote dataset or any other previously stored dataset of the server 110. The remote content dataset may include a library of virtual content or augmented information associated with real-world physical objects 104 or references. In this type of embodiment, the viewing device 102 can provide the server with the captured image of the physical object 104. The server 110 can use the received image to identify the physical object 104 and its corresponding virtual content. The server 110 can then return the virtual content to the viewing device 102.

The viewing device 102 can present the virtual content on the display of the viewing device 102 to augment the reality of the user 106. For example, the viewing device 102 can present the virtual content on the display of the viewing device 102 to allow the user 106 to simultaneously view the virtual content as well as the real-world physical environment in the line of sight of the user 106.

To further create the appearance that virtual content is a part of the user's real world environment, the viewing device 102 can present the virtual content based on a depth of a physical object 104 corresponding the virtual content. The depth of a physical object 104 is based on the distance of the physical object from the vehicle and/or the user 106 operating the vehicle. For example, the viewing device 102 can adjust a presentation size of the virtual content based on the distance between the vehicle and the physical object 104 corresponding to the virtual content. The presentation size is a physical size at which the virtual content is rendered on a display. Adjusting the presentation size of virtual content based on the depth of a physical object 104 creates the appearance that the virtual content is present in the user's real world environment at a similar depth as the physical object 104.

As an example, the viewing device 102 can increase the presentation size of virtual content corresponding to a building as the vehicle approaches the building (i.e., as the distance between the building and the vehicle decreases). As another example, the viewing device 102 can decrease the presentation size of virtual content corresponding to another vehicle as the other vehicle moves farther ahead (i.e., as the distance between the vehicle and the other vehicle increases).

Adjusting the presentation size of virtual content based on the depth of the corresponding physical object 104 creates the appearance that the virtual content is present in the user's real world environment at a similar depth as the physical object 104. Additionally, the viewing device 102 can present the virtual content at a position on the display that corresponds to the location of the physical object 104 as perceived by a user 106 operating the vehicle. Accordingly, the virtual content appears to the user to be nearby or overlapping the physical object 104 as well as presented at the same depth as the physical object 104.

The viewing device 102 continuously updates the presentation of the virtual content based on the depth and location of the physical object 104 in relation to the vehicle and/or the user 106 operating the vehicle by re-rendering the virtual content based on changes of the depth and location. As a result, the user 106 may perceive the virtual content to be fixed in a location of the user's real world environment as the user moves.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., viewing device 102). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
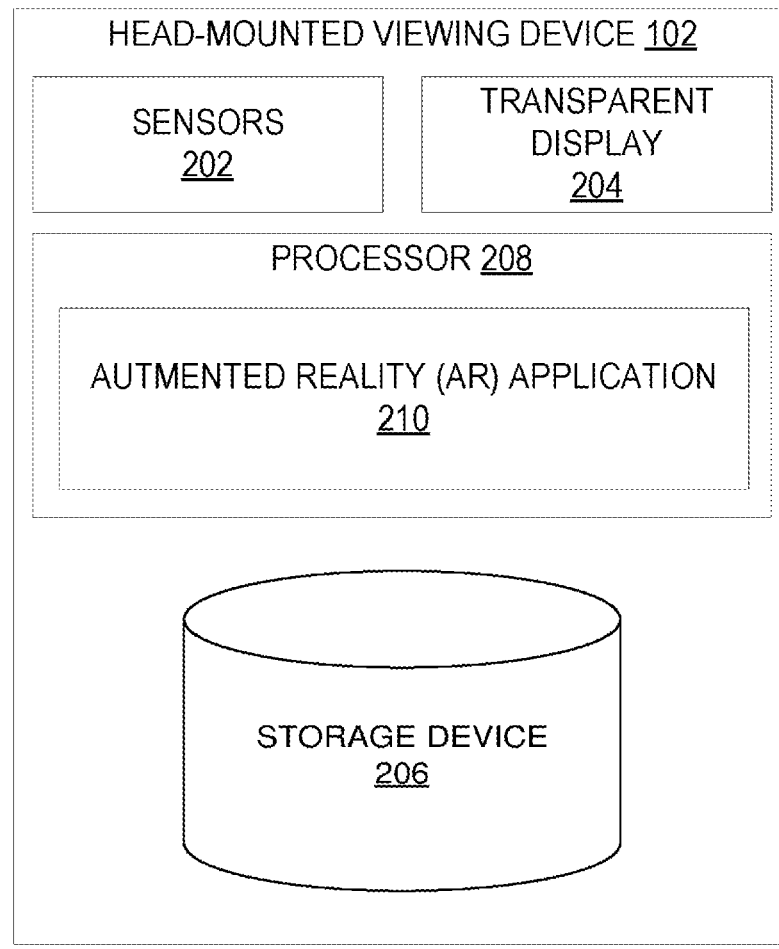
FIG. 2 illustrates a block diagram of an example embodiment of a viewing device, in accordance with some example embodiments.

FIG. 2 illustrates a block diagram of an example embodiment of a viewing device, in accordance with some embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the viewing device 102 to facilitate additional functionality that is not specifically described herein. Furthermore, the various functional modules depicted in FIG. 2 may reside on a single computing device or may be distributed across several computing devices in various arrangements such as those used in cloud-based architectures.

The viewing device 102 includes sensors 202, a transparent display 204, a computer processor 208, and a storage device 206. The viewing device 102 can be a wearable device, such as a helmet, a visor, or any other device that can be mounted to the head of a user 106. The viewing device 102 may also be a mobile computing device, such as a smartphone or tablet. The viewing device may also be a computing device integrated into a vehicle, such as an automobile, motorcycle, plane, boat, recreational vehicle (RV), etc.

The sensors 202 can include any type of known sensors. For example, the sensors 202 can include a thermometer, one or more infrared camera(s) and projector(s), a barometer, a humidity sensor, a proximity or location sensor (e.g., near field communication, GPS, Bluetooth, Wi-Fi), one or more optical sensor(s) (e.g., camera), an inertial sensor (e.g., gyroscope and/or accelerometer), an audio sensor (e.g., a microphone), or any suitable combination thereof. For example, the sensors 202 may include a rear-facing camera and a front-facing camera in the viewing device 102. As another example, the sensors can include multiple sensors placed at various points of a vehicle that determine distance from a physical object, such as a depth sensor or radar sensor. It is noted that the sensors described herein are for illustration purposes and the sensors 202 are thus not limited to the ones described.

The transparent display 204 includes, for example, a display configured to display virtual images generated and rendered by the processor 208. In another example, the transparent display 204 includes a touch-sensitive surface to receive a user input via a contact on the touch-sensitive surface. The transparent display 204 can be positioned such that the user 106 can simultaneously view virtual content presented on the transparent display and a physical object 104 in a line-of-sight of the user 106. For example, the transparent display 204 can be a HUD in an automobile or other vehicle that presents virtual content on a windshield of the vehicle while also allowing a user 106 to view physical objects 104 through the windshield. For example, the HUD can be configured to display virtual images itself or, alternatively, can presented virtual images projected onto the HUD.

The processor 208 includes an AR application 210 configured to present virtual content on the transparent display 204 to augment the reality of the user 106. The AR application 210 can receive data from sensors 202 (e.g., an image of the physical object 104, location data, etc.), and use the received data to identify a physical object 104 and present virtual content on the transparent display 204.

To identify a physical object 104, the AR application 210 determines whether an image captured by the viewing device 102 matches an image locally stored by the viewing device 102 in the storage device 206. The storage device 206 can include a local content dataset of images and corresponding virtual content. For example, the viewing device 102 can receive a content data set from the server 110, and store the received content data set in the storage device 206.

The AR application 210 can compare a captured image of the physical object 104 to the images locally stored in the storage device 206 to identify the physical object 104. For example, the AR application 210 can analyze the captured image of a physical object 104 to identify feature points of the physical object. The AR application 210 can utilize the identified feature points to identify the physical object 104 from the local content dataset.

In some embodiments, the AR application 210 can identify a physical object 104 based on a detected visual reference (e.g., a logo or QR code) on the physical object 104 (e.g., a chair). The visual reference may also be referred to as a marker and may consist of an identifiable image, symbol, letter, number, machine-readable code. For example, the visual reference may include a bar code, a quick response (QR) code, or an image that has been previously associated with the virtual content.

If the AR application 210 cannot identify a matching image from the local content dataset, the AR application 210 may provide the captured image of the physical object 104 to the server 110. The server 110 uses the captured image to search a remote content dataset maintained by the server 110.

The remote content dataset maintained by the server 110 can be larger than the local content dataset maintained by the viewing device 102. For example, the local content dataset maintained by the viewing device 102 can include a subset of the data included in the remote content dataset, such as a core set of images or the most popular images determined by the server 110.

Once the physical object 104 has been identified by either the viewing device 102 or the server 110, the corresponding virtual content can be retrieved and rendered on the transparent display 204 to augment the reality of the user 106 by displaying the virtual content so that the virtual content is overlain on the real-world view of the user through the transparent display. The AR application 210 can present the virtual content on the transparent display 204 to create an appearance to the user 106 that the virtual content is in the user's real world, rather than virtual content just presented on the display. For example, the AR application 210 can present arrows or other directional indicators that are overlain so that the arrows are displayed to be on the road in front of the user 106.

To create the appearance that virtual content is a part of the user's real world environment, the AR application 210 can render the virtual content on the transparent display 204 based on a depth of a physical object 104 corresponding the virtual content. The depth of a physical object 104 is based on the distance of the physical object from the vehicle and/or the user 106 operating the vehicle. For example, the AR application 210 can adjust one or more rendering/display parameters of the virtual content based on a determined distance between the vehicle and the physical object 104 corresponding to the virtual content. Adjusting the rendering/display parameters results in the virtual content being rendered/displayed with a particular presentation size, wherein the particular presentation size may be a physical size defined by pixel locations at which the virtual content is presented on the transparent display 204.

As an example, the AR application 210 can increase the presentation size of virtual content corresponding to a building as the vehicle approaches the building (i.e., as the distance between the building and the vehicle decreases). Accordingly, the physical size of the virtual content presented on the transparent display 204 will become larger as the distance between the building and the vehicle decreases (i.e., presentation size and depth may be inversely proportional) and as the size of the building appears larger to the user 106. As another example, the AR application 210 can decrease the presentation size of virtual content corresponding to another vehicle as the other vehicle moves farther away (i.e., as the distance between the vehicle and the other vehicle increases). Accordingly, the physical size of the virtual content presented on the transparent display 204 will become smaller as the distance between the vehicle and the other vehicle increases and as the size of the other vehicle appears smaller to the user 106. In another embodiment, the virtual content may include an informational graphic such as, and without limitation, license plate information, textual information, descriptive information, object profile information, or the like. Furthermore, the AR application 210 may decrease presentation size of the virtual content displayed on the transparent display 204 as a physical objected may be detected to have decreasing depth/distance (i.e. moving closer to the vehicle and/or user), thus presentation size and depth may be directly proportional. Accordingly, the AR application 210 may increase a presentation size of the virtual content displayed on the transparent display 204 as a physical objected may be detected to have increasing depth/distance (i.e. moving away from the vehicle and/or user).

Adjusting the presentation size of virtual content based on a detected depth of the corresponding physical object 104 creates the appearance that the virtual content is present in the user's real world environment at a similar depth as the physical object 104. To further create this effect, the AR application 210 may present the virtual content at a display position on the transparent display 204 that corresponds to the location of the physical object 104 as perceived by a user 106 operating the vehicle. The display position is a position (e.g., coordinates) on the transparent display 204 at which the virtual content is rendered. For example, the virtual content may be presented at a display position that causes the virtual content to virtually overlap with and/or appear nearby the physical object 104 when viewed by the user 106.

The AR application 210 continuously updates presentation of the virtual content based on the depth and location of the physical object 104 in relation to the vehicle and/or the user 106 operating the vehicle. As the vehicle and physical object move with respect to each other, new depth and location data may be used by the AR application 210 to re-render the virtual content on the transparent display 204, at display positions that correspond to the new depth and location data. As a result, the user 106 may perceive the virtual content as a part of the user's real world environment.

The AR application 210 determines the depth of a physical object based on sensor data gathered from the sensors 202. In the present embodiment, the sensors 202 include depth sensors configured to determine the distance of a physical object 104 from the vehicle.

In one exemplary embodiment, the AR application 210 utilizes images captured by optical sensors to determine the distance of a physical object 104, wherein the AR application 210 can determine the physical object 104 based on at least one captured image and further determine the distance of the physical object based on a size of an object image in the captured image in relation to a known size of the physical object 104. For example, a stereoscopic imaging technique may be utilized to determine the distance of a physical object. As another example a structured light pattern may be projected in an environment, imaged, and analyzed to determine the depth of an object with the environment.

In another exemplary embodiment, the AR application 210 utilizes time of flight (ToF) technique, such as, and without limitation, radar, infrared projection and imaging, and/or LiDAR to determine a depth of an object within an environment.

In yet another embodiment, the AR application may use a combination of the above techniques, wherein the techniques are weighted and considered with respect to optimal operability based on lighting conditions, speed of motion between a vehicle and physical object, weather, and/or other environmental conditions.

The AR application 210 updates presentation of the virtual content as the vehicle and/or physical object 104 change positions. For example, the AR application 210 can gather updated sensor data from the sensors 202 as the vehicle moves and determine an updated depth and position of the physical object 104 in relation to the vehicle. The AR application 210 updates presentation of the virtual content based on the determined updated depth and position of the physical object 104 in relation to the vehicle. For example, the AR application 210 adjusts a display size and display position of the virtual content based on the updated depth and position of the physical object 104. The AR application 210 presents the updated presentation of the virtual content on the transparent display 204, thereby providing the user 106 with a continuous depiction of the virtual content in relation to the physical object 104.

The network 108 may be any network that enables communication between or among machines, databases, and devices (e.g., the viewing device 102). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
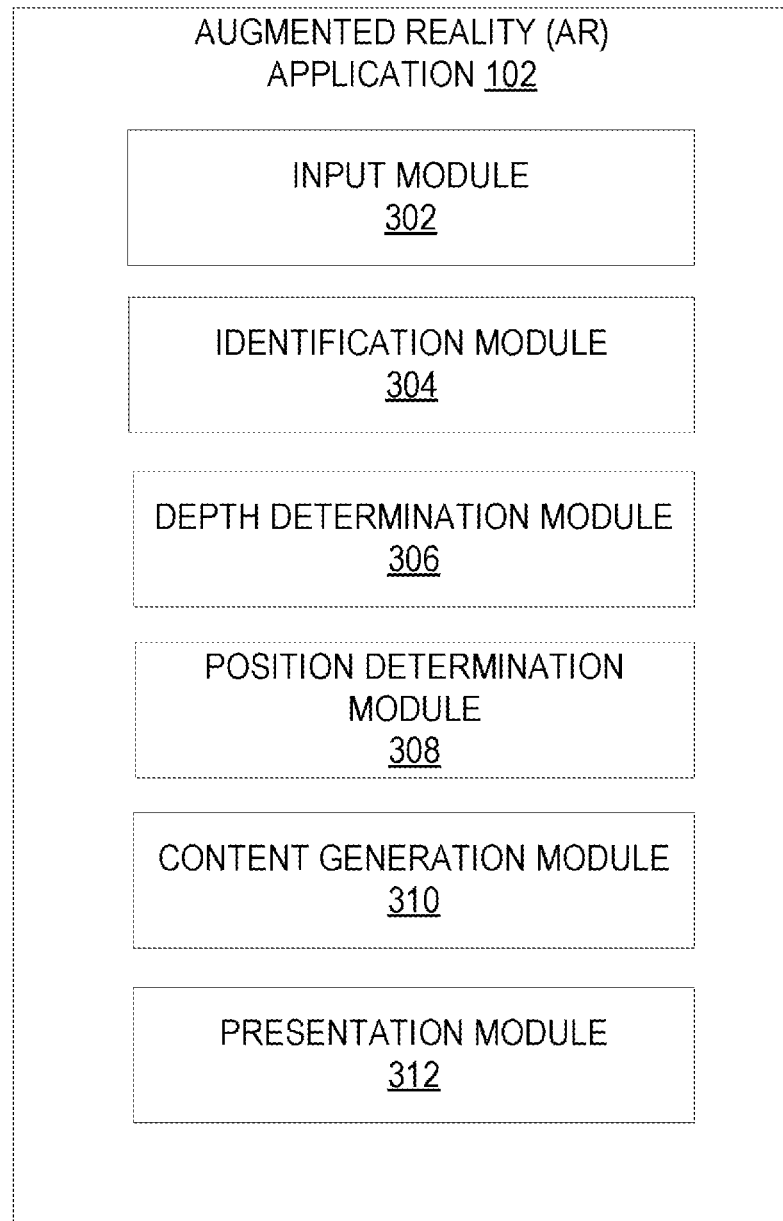
FIG. 3 illustrates a block diagram illustrating an example embodiment of an AR application, in accordance with some example embodiments.

FIG. 3 illustrates a block diagram of an example embodiment of an AR application 210, according to some embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the AR application 102 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the AR application 210 includes an input module 302, an identification module 304, a depth determination module 306, a position determination module 308, a content generation module 310 and a display module 312.

The input module 302 receives sensor data from sensors 202, sensor data may include, for example, and without limitation optical image data of the physical object 104, ToF data, imaged light patterns, location/positional data, other data associated with an operation of the various sensors, and a combination thereof. The input module 302 provides the received sensor data to any of the other modules included in the AR application 210.

The identification module 304 identifies a physical object 104 and corresponding virtual content based on an image of the physical object 104 captured by sensors 202 of the viewing device 102. For example, the identification module 304 can determine whether the captured image matches or is similar to an image locally stored by the viewing device 102 in the storage device 206.

The identification module 304 compares a captured image of the physical object 104 to a local content dataset of images locally stored in the storage device 206 to identify the physical object 104. For example, the identification module 304 can analyze the captured image of a physical object 104 to identify feature points of the physical object. The identification module 304 can utilize the identified feature points to identify the physical object 104 from the local content dataset.

In some embodiments, the identification module 304 can identify a physical object 104 based on a detected visual reference (e.g., a logo or QR code) on the physical object 104 (e.g., a stoplight, road sign, street marking, vehicle). The visual reference may also be referred to as a marker and may consist of an identifiable image, symbol, letter, number, machine-readable code. For example, the visual reference may include a bar code, a quick response (QR) code, or an image that has been previously associated with the virtual content. The local content dataset can include a listing of visual references and corresponding virtual content. The identification module 304 can compare visual references detected in a captured image to the visual references include in the local content dataset.

If the identification module 304 cannot identify a matching image from the local content dataset, the identification module 304 can provide the captured image of the physical object 104 to the server 110 and the server 110 can search a remote content dataset maintained by the server 110.

Once the physical object 104 has been identified, the identification module 304 can access the corresponding virtual content to be presented on the transparent display 204 to augment the reality of the user 106.

The depth determination module 306, determines a depth of a physical object 104. The depth of a physical object 104 indicates a distance of the physical object 104 from the vehicle. For example, the depth of a physical object 104 indicates the distance of the 104 from the front bumper of the vehicle. As another example, the physical object depth of a physical object 104 indicates the distance of the physical object 104 from a user 106 that is operating (e.g., driving) the vehicle.

The depth determination module 306 may utilize a variety of depth techniques and/or technologies to determine the depth of a physical object 104. In some embodiments, the sensors 202 may include sensors designed to determine the distance of a physical object 104. For example, the sensors 202 can include depth or radar sensors that emit a signal towards a physical object 202 and receive a response signal as a result of the signal reflecting back from the physical object 104. The distance of the physical object 104 can then be determined based on the period of elapsed time between the signal being emitted and the response signal being received.

In some embodiments, the depth determination module 306 may utilize captured images of a physical object 104 to determine the depth of the physical object 104. Once a physical object 104 has been identified by the identification module 304, the depth determination module 306 can determine a known size of the physical object 104. For instance, a known size of the physical object 104 can be stored along with the virtual content corresponding to the physical object 104. The depth determination module 306 can determine a depth of the physical object 104 based on a size of the physical object 104 in the captured image in relation to known size of the physical object 104.

In some embodiments, captured images of a physical object 104 may be captured utilizing a stereoscopic imaging technique, wherein depth of the physical object may be determined.

In some embodiments, the depth determination module 306 utilizes map data to determine the depth of a physical object 104. For example, the depth determination module 306 may have access to map data describing the geographic coordinates of stationary physical objects, such as buildings, bridges, etc. The depth determination module 306 can gather sensor data describing the current geographic location of the vehicle (e.g., GPS data) and determine the depth of the physical object 104 based on the current geographic location of the vehicle in relation to the geographic coordinates of the physical object 104.

In some embodiments, the depth determination module 306 may determine a depth of a physical object 104 from a combination of two or more of the above depth techniques. For example, the depth determination module 306 may determine a final distance between a vehicle and physical object 104, wherein determining the final distance may include the depth determination module calculating a mean, median, or mode of several initial determined distances. The determined initial distance may be calculated based on each of the depth techniques respectively. Furthermore, environmental conditions (e.g. night, day, visibility) may be detected and utilized to prioritize an importance of one of the depth techniques more than other depth techniques.

Once the depth determination module 306 has initially determined the depth of a physical object 104 from the vehicle, the depth determination module 306 can monitor movement of the vehicle to determine an updated depth of the physical object 104. For example, the sensors 202 can include sensors that describe movements of the vehicle, a speed of the vehicle, etc. The depth determination module 306 can utilize this type of movement data gathered by the sensors to determine an updated position of the vehicle in relation to the physical object 104 and, accordingly, an updated depth of the physical object 104.

The position determination module 308, determines the position of the physical object 104 in relation to the vehicle. The position determination module 308 can analyze images of the physical object 104 to determine the position of the physical object 104 in relation to the vehicle. For example, the position determination module 308 can analyze images captured by the sensors 202 and identify the physical object in the captured image. The position determination module 308 then determines the position of the physical object 104 in relation to the vehicle based on the location of the physical object 104 in the captured image. E]

The content generation module 310 generates virtual content based on the depth of a physical object 104 determined by depth determination module 306. For example, the content generation module 310 adjusts the display size of the virtual content based on the depth of a corresponding physical object 104.

The display module 312 renders the virtual content on the transparent display 204. This can include virtual content intended to augment physical objects 104 visible through the transparent display 204. The presentation module 312 can render the virtual content based on the position of a physical object 104 corresponding to the virtual content. For example, the presentation module 312 can render the virtual content at a display position on the transparent display 204 that causes the virtual content to appear as overlapping and/or near the physical object 104 to a user 106 operating the vehicle.

In some embodiments, the display module 312 presents virtual content in relation to a focal point that is based on a depth of a physical object 104. The virtual content can appear to extend outwards from the focal point. For example, virtual content representing directions to turn at an upcoming cross street can appear to extend outward towards the vehicle from a focal point based on the depth of the upcoming cross street from the vehicle. The virtual content can further include an arrow extending from the focal point that depicts the direction that the user should turn at the upcoming cross street. The display module 312 can render the virtual content at an display position on the transparent display 204 such that the virtual content overlaps with the road, path, etc., that is visible to the user operating the vehicle. Accordingly, the directions will appear to correspond physically to the user's real world environment.

The display module 312 continuously updates rendering of virtual content on the transparent display 204. For example, the display module 312 updates the display of the virtual content as the depth and/or position of a physical object 104 changes. Accordingly, the virtual content appears to be a part of the user's real world environment and paired with its corresponding physical object.

Figure 4:
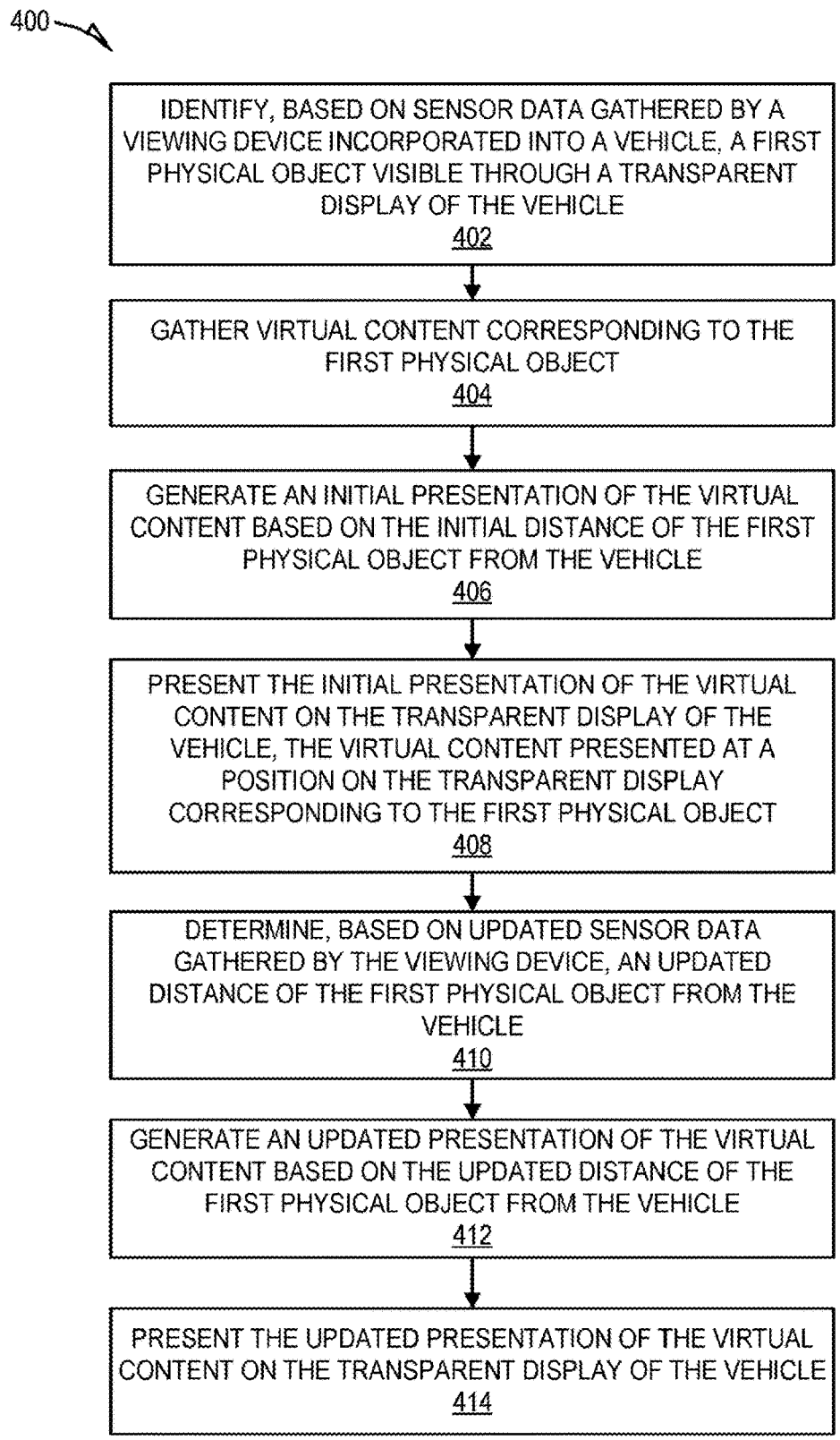
FIG. 4 illustrates an example method for adjusting presentation of virtual content, in accordance with some example embodiments.

FIG. 4 illustrates an example method for adjusting presentation of virtual content, in accordance with some example embodiments. The method 400 may be embodied in computer readable instructions for execution by one or more processors such that the operations of the method 400 may be performed in part or in whole by the AR application 210; accordingly, the method 400 is described below by way of example with reference thereto. However, it shall be appreciated that at least some of the operations of the method 400 may be deployed on various other hardware configurations and the method 400 is not intended to be limited to the AR application 210.

At operation 402, the identification module 304 identifies, based on sensor data gathered by a viewing device 102 incorporated into a vehicle, a physical object 104 visible through a transparent display 204 of the vehicle. The sensor data indicates an initial distance (i.e., depth) of the physical object 104 from the vehicle. The physical object 104 can be any type of physical object such as another vehicle or a building.

At operation 404, the identification module 304 gathers virtual content corresponding to the physical object 104.

At operation 406, the content generation module 310 generates an initial presentation of the virtual content based on the initial distance of the physical object 104 from the vehicle. The initial presentation of the virtual content is at a first display size based on the initial distance of the physical object 104 from the vehicle.

At operation 408, the display module 312 renders the initial presentation of the virtual content on the transparent display 204 of the vehicle. The virtual content is rendered at a position on the transparent display 204 corresponding to the physical object 104.

At operation 410, the position determination module 308 determines, based on updated sensor data gathered by the viewing device 102, an updated distance of the physical object 104 from the vehicle. For example, the updated distance can be either greater or less than the initial distance as a result of the physical object 104 moving away from the vehicle or the vehicle moving closer to the physical object.

At operation 412, the content generation module 310 generates an updated presentation of the virtual content based on the updated distance of the physical object 104 from the vehicle. For example, the content generation module 310 generated the virtual content at a second display size based on the updated distance of the physical object 104 from the vehicle. The second display size is different than the first display size. For example, when the updated distance is greater than the initial distance (i.e., the physical object 104 is farther away from the vehicle) the updated presentation size is smaller than the initial presentation size. Alternatively, when the updated distance is less than the initial distance (i.e., the physical object 104 is closer to the vehicle) the updated presentation size is larger than the initial presentation size.

At operation 414, the presentation module 312 presents the updated presentation of the virtual content on the transparent display of the vehicle.

Figure 5:
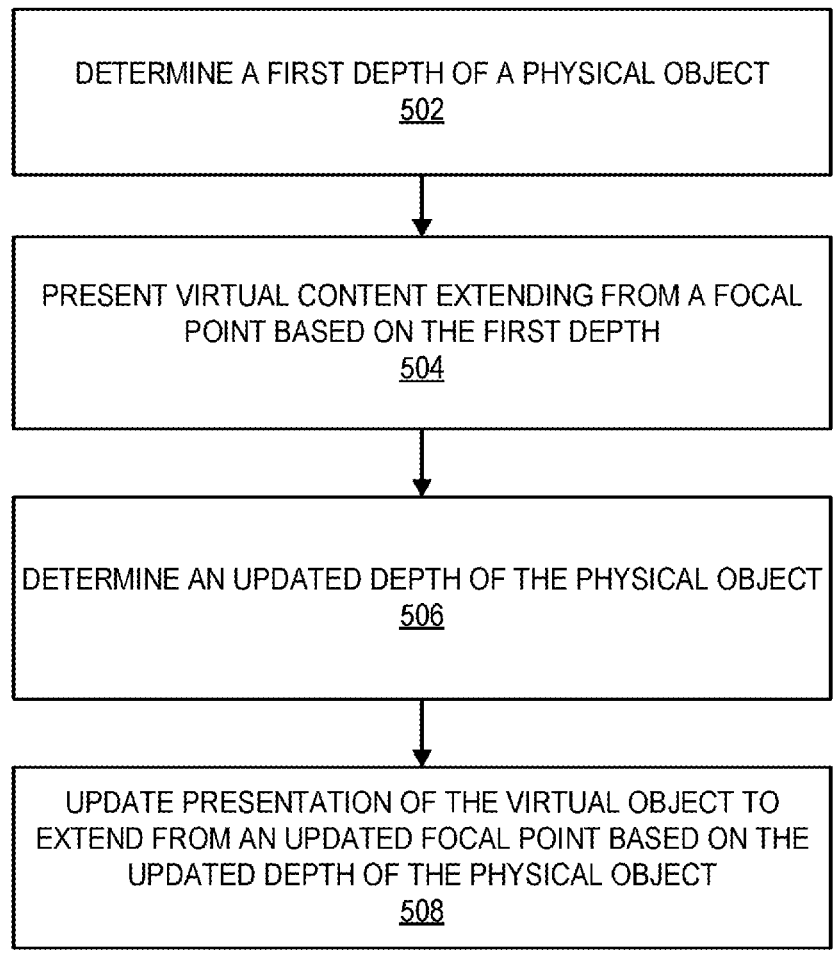
FIG. 5 illustrates another example method for presenting virtual content, in accordance with some example embodiments.

FIG. 5 is an example method for presenting virtual content extending from a focal point based on the depth of a physical object, according to some example embodiments. The method 500 may be embodied in computer readable instructions for execution by one or more processors such that the operations of the method 500 may be performed in part or in whole by an AR application 210; accordingly, the method 500 is described below by way of example with reference thereto. However, it shall be appreciated that at least some of the operations of the method 500 may be deployed on various other hardware configurations and the method 500 is not intended to be limited to the AR application 210.

At operation 502, the depth determination module 308 determines a first depth of a physical object 104. The physical object 104 can be an upcoming cross street.

At operation 504, the presentation module 312 presents virtual content extending from a focal point based on the first depth. For example, the virtual content can be a directional indicator that directs a user operating a vehicle to the upcoming cross street as well as identifies a direction to turn at the upcoming cross street. The focal point that the directional indicator extends outwards from (e.g., outwards towards the user 106 and/or towards the direction the user 106 is being directed to turn) is presented corresponding to the depth of the upcoming cross street. As a result, the user 106 can easily visualize where they are supposed to turn.

At operation 506, the depth determination module 308 determines an updated depth of the physical object 104. This can be a result of the vehicle travelling towards the upcoming cross street.

At operation 508, the presentation module 312 updates presentation of the virtual object to extend from an updated focal point based on the updated depth of the physical object 104. As a result, the directional indicator presented to the user will be updated to correspond with the updated depth of the upcoming cross street.

Figure 6A:
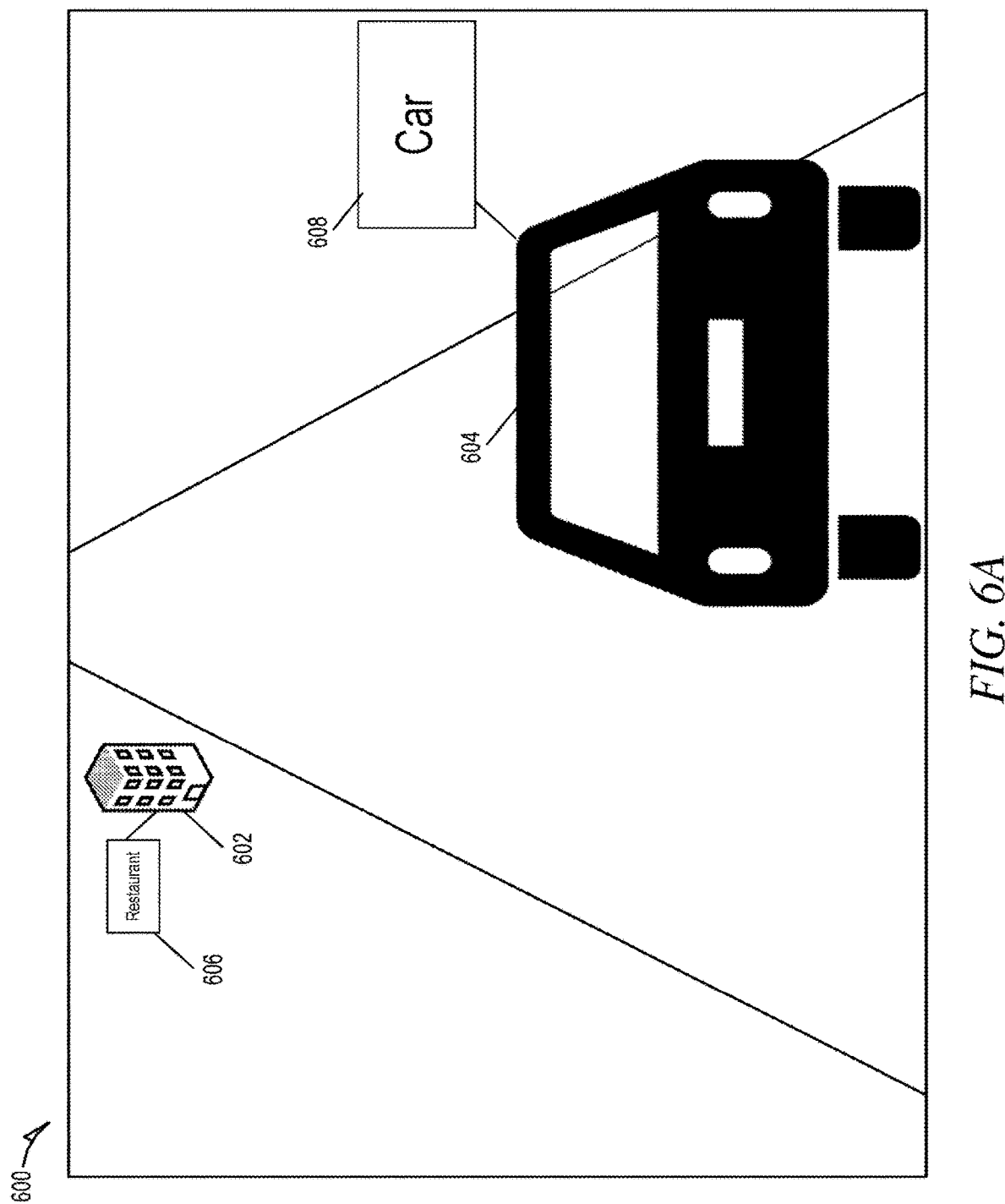
FIGS. 6A-6C illustrate screenshots of an exemplary HUD environment wherein virtual content may be displayed, in accordance with some example embodiments.
Figure 6B:
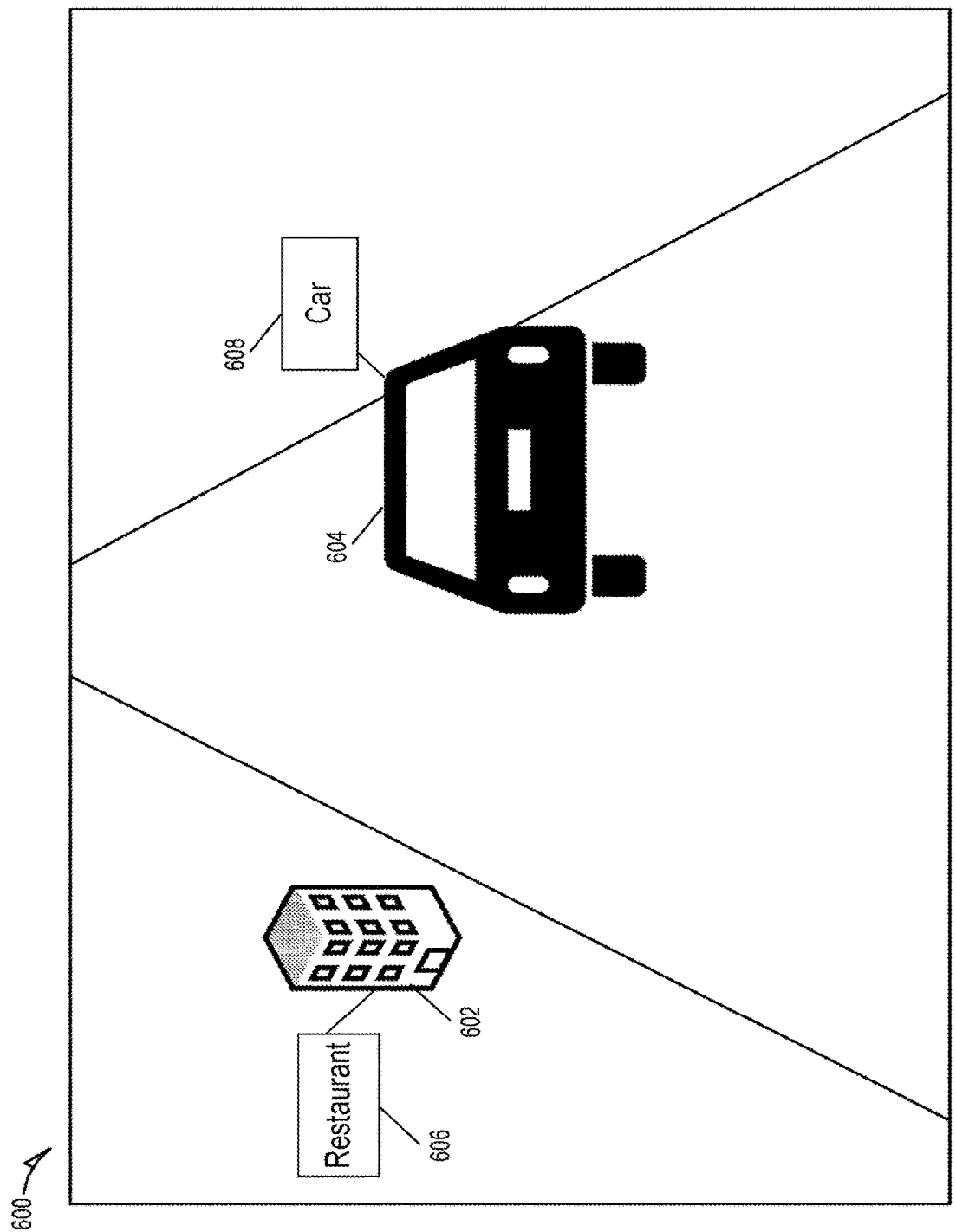
Figure 6C:
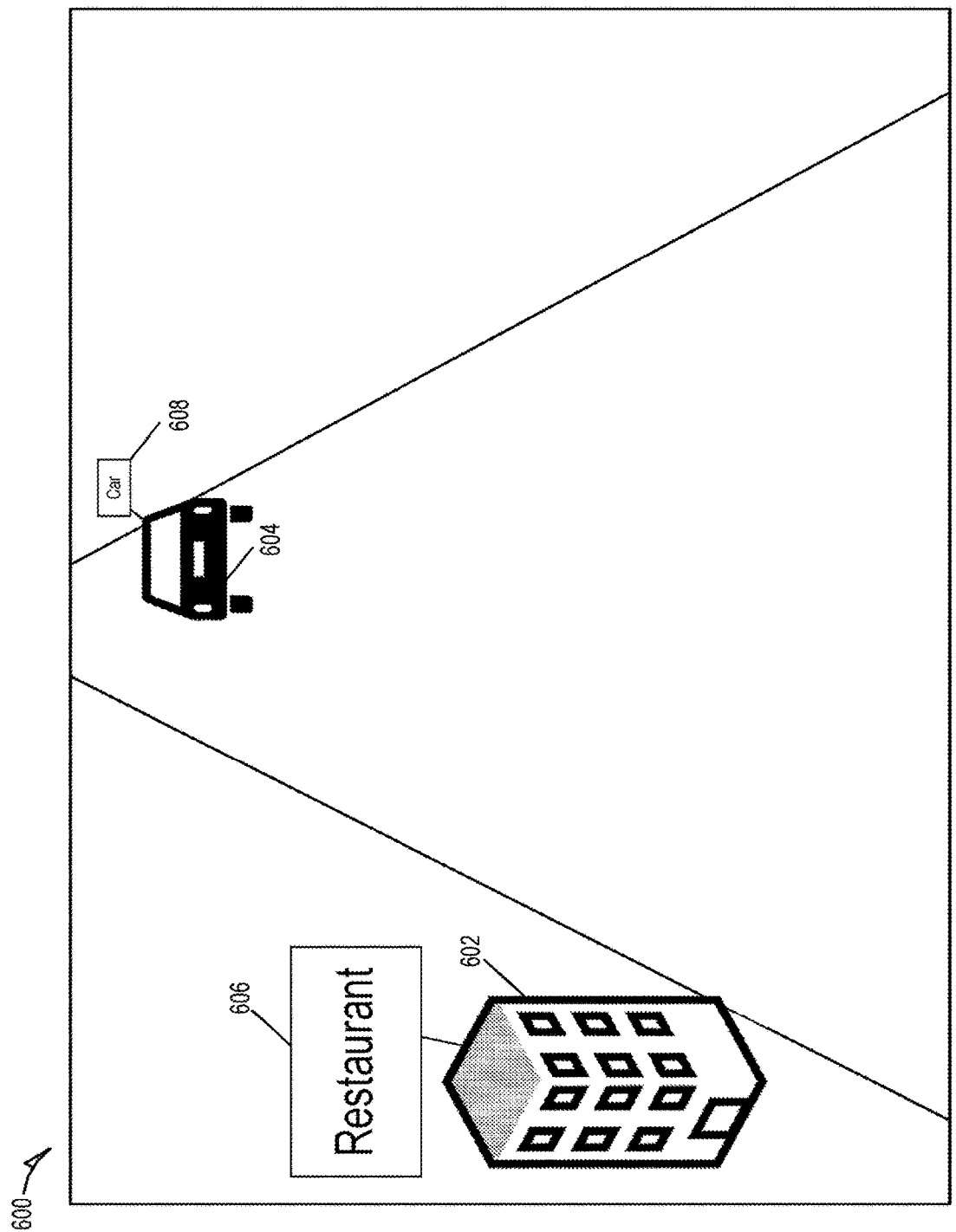

FIGS. 6A-6C are screenshots of a HUD presenting virtual content based on the depth of a physical object, according to some embodiments. FIG. 6A shows a HUD 600 through which a building 602 and automobile 604 are visible. The HUD 600 is presenting a virtual content item 606 that corresponds to the building 602, and a virtual content item 608 that corresponds to the automobile 604. As shown, the size of the virtual content item 606 is smaller than the virtual content item 608 because the depth of the building 602 (i.e., the distance to the building) is greater than the depth of the automobile 604 (i.e., the distance to the automobile 604).

As shown in FIG. 6B, the depth of the building 602 and the depth of the automobile 604 are fairly similar. Likewise, the virtual content item 606 corresponding to the building 602, and the virtual content item 608 corresponding to the automobile 604 are also similar in size due to the similar depth of their corresponding physical objects (i.e., the building 602 and the automobile 604).

As shown in FIG. 6C, the depth of the building 602 is less than the depth of the automobile 604 (i.e., the building 102 is closer than the automobile 604. Accordingly, the virtual content item 606 corresponding to the building 602 is larger than the virtual content item 608 corresponding to the automobile 604.

Figure 7B:
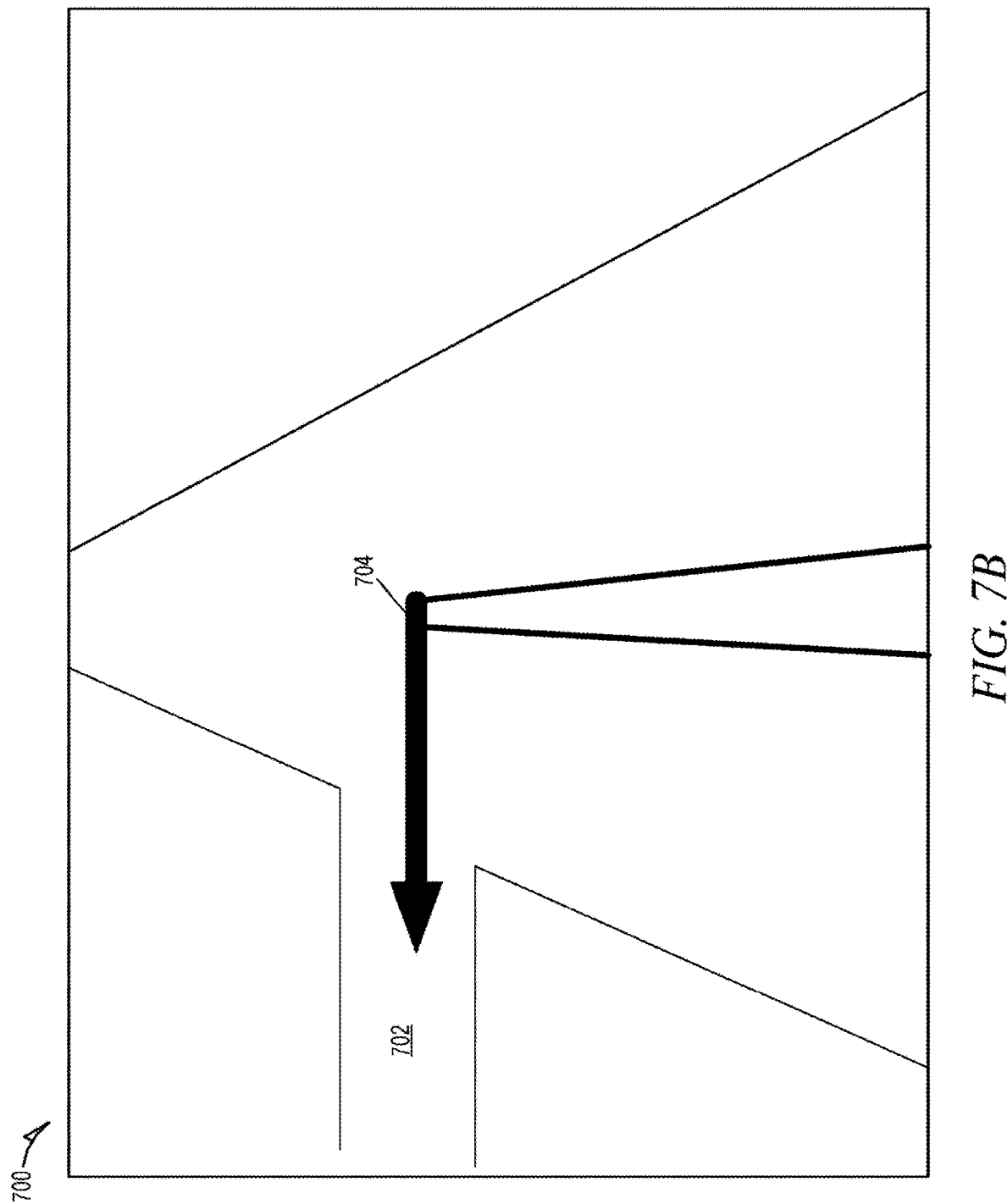

FIG. 7A-7C are screenshots of a HUD presenting virtual content extending from a focal point based on the depth of a physical object, according to some embodiments. FIG. 7A shows a HUD 700, through which an upcoming cross street 702 is visible. As show, virtual content depicting directional indicators are extending outwards from a focal point 704. For example, the directional indicator extends outwards towards the user 106 looking through the HUD 700, as well as outwards towards the upcoming cross street 702 to indicate that the user 106 should turn left. The focal point 704 is based on the depth of the upcoming cross street 702 to provide the user 106 with an accurate representation of where to turn.

In FIG. 7B, the depth of the upcoming cross street 702 is less (i.e., the distance to the upcoming cross street 702 is shorter). Accordingly, the focal point 704 has been updated based on the updated depth of the upcoming cross street 702 and appears lower on the HUD 700.

In FIG. 7C, the depth of the upcoming cross street 702 is even less (i.e., the distance to the upcoming cross street 702 is even shorter). Accordingly, the focal point 704 has been updated based on the updated depth of the upcoming cross street 702 and appears even lower on the HUD 700.

EXAMPLES

Examples can include subject matter such as a method, means for performing acts of the method, at least one machine-readable medium including instructions that, when performed by a machine cause the machine to performs acts of the method, or of an apparatus or system for entity-based routing in a network and between data centers, according to embodiments and examples described herein.

Example 1 is a method comprising: identifying, based on sensor data gathered by a viewing device incorporated into a vehicle, a first physical object visible through a transparent display of the vehicle, the sensor data indicating an initial distance of the first physical object from the vehicle; gathering virtual content corresponding to the first physical object; generating an initial presentation of the virtual content based on the initial distance of the first physical object from the vehicle; presenting the initial presentation of the virtual content on the transparent display of the vehicle, the virtual content presented at a position on the transparent display corresponding to the first physical object; determining, based on updated sensor data gathered by the viewing device, an updated distance of the first physical object from the vehicle; generating an updated presentation of the virtual content based on the updated distance of the first physical object from the vehicle; and presenting the updated presentation of the virtual content on the transparent display of the vehicle.

In Example 2, the subject matter of Example 1 optionally includes wherein the initial presentation of the virtual content is at a first presentation size and the updated presentation of the virtual content is at a second presentation size that is different than the first presentation size.

In Example 3, the subject matter of any one or more of Examples 1-2 optionally includes wherein the updated distance is greater than the initial distance, and the updated presentation size is smaller than the initial presentation size.

In Example 4, the subject matter of any one or more of Examples 1-3 optionally includes wherein the updated distance is less than the initial distance, and the updated presentation size is greater than the initial presentation size.

In Example 5, the subject matter of any one or more of Examples 1-4 optionally includes wherein the first physical object is another vehicle.

In Example 6, the subject matter of any one or more of Examples 1-5 optionally includes wherein the first physical object is a building.

In Example 7, the subject matter of any one or more of Examples 1-6 optionally includes wherein the first presentation of the virtual content is generated based on an initial focal point and the second presentation is generated based on a second focal point that is different than the first focal point, the first focal point corresponding to the initial distance of the first physical object from the vehicle and the second focal point corresponding to the updated distance of the first physical object from the vehicle.

In Example 8, the subject matter of any one or more of Examples 1-7 optionally includes wherein the first presentation of the virtual content appears to extend towards the vehicle from the first focal point and the updated presentation of the virtual content appears to extend towards the vehicle from the second focal point.

In Example 9, the subject matter of any one or more of Examples 1-8 optionally includes wherein the first physical object is a cross-street located ahead of the vehicle.

In Example 10, the subject matter of any one or more of Examples 1-9 optionally includes generating a presentation of a second virtual content corresponding to the vehicle, the presentation of the second virtual content generated based on a distance between a user operating the vehicle and a front end of the vehicle; and presenting the second virtual content on the transparent display of the vehicle.

Example 11 is a viewing device incorporated into a vehicle comprising: one or more computer processors; and one or more computer-readable mediums storing instructions that, when executed by the one or more computer processors, cause the viewing device to perform operations comprising: identifying, based on sensor data gathered by the viewing device, a first physical object visible through a transparent display of the vehicle, the sensor data indicating an initial distance of the first physical object from the vehicle; gathering virtual content corresponding to the first physical object; generating an initial presentation of the virtual content based on the initial distance of the first physical object from the vehicle; presenting the initial presentation of the virtual content on the transparent display of the vehicle, the virtual content presented at a position on the transparent display corresponding to the first physical object; determining, based on updated sensor data gathered by the viewing device, an updated distance of the first physical object from the vehicle; generating an updated presentation of the virtual content based on the updated distance of the first physical object from the vehicle; and presenting the updated presentation of the virtual content on the transparent display of the vehicle.

In Example 12, the subject matter of Example 11 optionally includes wherein the initial presentation of the virtual content is at a first presentation size and the updated presentation of the virtual content is at a second presentation size that is different than the first presentation size.

In Example 13, the subject matter of any one or more of Examples 11-12 optionally includes wherein the updated distance is greater than the initial distance, and the updated presentation size is smaller than the initial presentation size.

In Example 14, the subject matter of any one or more of Examples 11-13 optionally includes wherein the updated distance is less than the initial distance, and the updated presentation size is greater than the initial presentation size.

In Example 15, the subject matter of any one or more of Examples 11-14 optionally includes wherein the first physical object is another vehicle.

In Example 16, the subject matter of any one or more of Examples 11-15 optionally includes wherein the first physical object is a building.

In Example 17, the subject matter of any one or more of Examples 11-16 optionally includes wherein the first presentation of the virtual content is generated based on an initial focal point and the second presentation is generated based on a second focal point that is different than the first focal point, the first focal point corresponding to the initial distance of the first physical object from the vehicle and the second focal point corresponding to the updated distance of the first physical object from the vehicle.

In Example 18, the subject matter of any one or more of Examples 11-17 optionally includes wherein the first presentation of the virtual content appears to extend towards the vehicle from the first focal point and the updated presentation of the virtual content appears to extend towards the vehicle from the second focal point.

In Example 19, the subject matter of any one or more of Examples 11-18 optionally includes wherein the first physical object is a cross-street located ahead of the vehicle.

Example 20 is a non-transitory computer-readable medium storing instructions that, when executed by one or more computer processors of a viewing device incorporated into a vehicle, cause the viewing device to perform operations comprising: identifying, based on sensor data gathered by the viewing device, a first physical object visible through a transparent display of the vehicle, the sensor data indicating an initial distance of the first physical object from the vehicle; gathering virtual content corresponding to the first physical object; generating an initial presentation of the virtual content based on the initial distance of the first physical object from the vehicle; presenting the initial presentation of the virtual content on the transparent display of the vehicle, the virtual content presented at a position on the transparent display corresponding to the first physical object; determining, based on updated sensor data gathered by the viewing device, an updated distance of the first physical object from the vehicle; generating an updated presentation of the virtual content based on the updated distance of the first physical object from the vehicle; and presenting the updated presentation of the virtual content on the transparent display of the vehicle.

Figure 8:
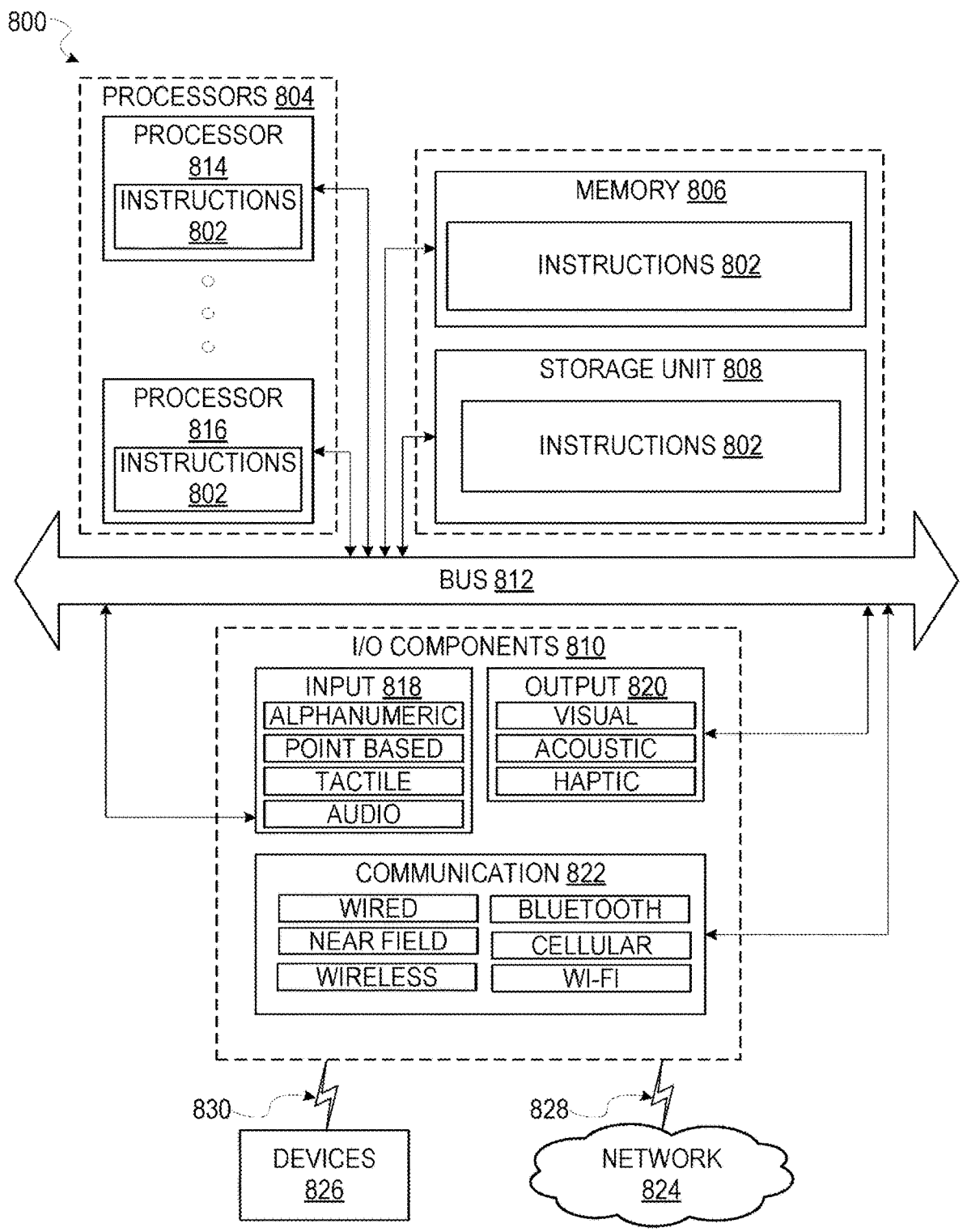
FIG. 8 illustrates a diagrammatic representation of a computing device in the example form of a computer system within which a set of instructions for causing the computing device to perform any one or more of the methodologies discussed herein may be executed.

FIG. 8 is a block diagram illustrating components of a computing device 800, according to some example embodiments, able to read instructions from a machine-readable medium (e.g., a machine-readable storage medium) and perform any one or more of the methodologies discussed herein. Specifically, FIG. 8 shows a diagrammatic representation of computing device 800 in the example form of a system, within which instructions 802 (e.g., software, a program, an application, an applet, an app, a driver, or other executable code) for causing computing device 800 to perform any one or more of the methodologies discussed herein may be executed. For example, instructions 802 include executable code that causes computing device 800 to execute methods 400 and 500. In this way, these instructions transform the general, non-programmed machine into a particular machine programmed to carry out the described and illustrated functions in the manner described herein. Computing device 800 may operate as a standalone device or may be coupled (e.g., networked) to other machines.

By way of non-limiting example, computing device 800 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing instructions 802, sequentially or otherwise, that specify actions to be taken by computing device 800. Further, while only a single computing device 800 is illustrated, the term "machine" shall also be taken to include a collection of computing devices 800 that individually or jointly execute instructions 802 to perform any one or more of the methodologies discussed herein.

Computing device 800 may include processors 804, memory 806, storage unit 808 and I/O components 810, which may be configured to communicate with each other such as via bus 812. In an example embodiment, processors 804 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 814 and processor 816 that may execute instructions 802. The term "processor" is intended to include multi-core processors that may comprise two or more independent processors (sometimes referred to as "cores") that may execute instructions contemporaneously. Although FIG. 8 shows multiple processors, computing device 800 may include a single processor with a single core, a single processor with multiple cores (e.g., a multi-core process), multiple processors with a single core, multiple processors with multiples cores, or any combination thereof.

Memory 806 (e.g., a main memory or other memory storage) and storage unit 808 are both accessible to processors 804 such as via bus 812. Memory 806 and storage unit 808 store instructions 802 embodying any one or more of the methodologies or functions described herein. In some embodiments, database 816 resides on storage unit 808. Instructions 802 may also reside, completely or partially, within memory 806, within storage unit 808, within at least one of processors 804 (e.g., within the processor's cache memory), or any suitable combination thereof, during execution thereof by computing device 800. Accordingly, memory 806, storage unit 808, and the memory of processors 804 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 802. The term "machine-readable medium" shall also be taken to include any medium, or combination of multiple media, that is capable of storing instructions (e.g., instructions 802) for execution by a machine (e.g., computing device 800), such that the instructions, when executed by one or more processors of computing device 800 (e.g., processors 804), cause computing device 800 to perform any one or more of the methodologies described herein (e.g., methods 400 and 500). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 810 may include a wide variety of components to receive input, provide output, produce output, transmit information, exchange information, capture measurements, and so on. The specific I/O components 810 that are included in a particular machine will depend on the type of machine. For example, portable machines such as mobile phones will likely include a touch input device or other such input mechanisms, while a headless server machine will likely not include such a touch input device. It will be appreciated that I/O components 810 may include many other components that are not specifically shown in FIG. 8. I/O components 810 are grouped according to functionality merely for simplifying the following discussion and the grouping is in no way limiting. In various example embodiments, I/O components 810 may include input components 818 and output components 820. Input components 818 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. Output components 820 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. I/O components 810 may include communication components 822 operable to couple computing device 800 to network 824 or devices 826 via coupling 828 and coupling 830, respectively. For example, communication components 822 may include a network interface component or other suitable device to interface with network 824. In further examples, communication components 822 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 826 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method for presenting content related to a destination to a user on a transparent surface of a vehicle, the method comprising:
    identifying a first physical object and providing an initial distance of the first physical object from the vehicle at a first time, wherein the initial distance of the first physical object from the vehicle is determined using map data related to the first physical object;
    gathering virtual content corresponding to the first physical object;
    generating an initial presentation of the virtual content based on the initial distance of the first physical object from the vehicle, the virtual content being a directional indicator indicating a direction to a destination from the physical object;
    presenting the initial presentation of the virtual content on the transparent surface of the vehicle, the virtual content presented at a position on the transparent surface corresponding to the first physical object;
    determining an updated distance of the first physical object from the vehicle at a second time later than the first time;
    generating an updated presentation of the virtual content based on the updated distance of the first physical object from the vehicle; and
    presenting the updated presentation of the virtual content on the transparent surface of the vehicle.

2. The method of claim 1, wherein the initial distance of the first physical object from the vehicle is determined using the map data related to the first physical object and sensor data describing a geographic location of the vehicle.

3. The method of claim 2, wherein the sensor data describing the geographic location of the vehicle are GPS data.

4. The method of claim 1, wherein the initial presentation of the virtual content is at a first presentation size and the updated presentation of the virtual content is at a second presentation size that is different than the first presentation size.

5. The method of claim 4, wherein the initial presentation of the virtual content appears present in the user's real world environment at a similar depth as the first physical object at the first time, and the updated presentation of the virtual content appears present in the user's real world environment at a similar depth as the first physical object at the second time.

6. The method of claim 4, wherein the initial presentation of the virtual content appears present in the user's real world environment at a location corresponding to a location of the first physical object at the first time, and the updated presentation of the virtual content appears present in the user's real world environment at a location corresponding a location of the first physical object at the second time.

7. The method of claim 4, wherein the updated distance is greater than the initial distance, and the updated presentation size is smaller than the initial presentation size.

8. The method of claim 4, wherein the updated distance is less than the initial distance, and the updated presentation size is greater than the initial presentation size.

9. The method of claim 4, wherein presenting the initial presentation of the virtual content on the transparent surface comprises projecting the initial presentation of the virtual content onto a windshield of the vehicle.

10. The method of claim 1, wherein the first presentation of the virtual content is generated based on an initial focal point and the second presentation is generated based on a second focal point that is different than the first focal point, the first focal point corresponding to the initial distance of the first physical object from the vehicle and the second focal point corresponding to the updated distance of the first physical object from the vehicle.

11. The method of claim 10, wherein the first physical object is a cross-street located ahead of the vehicle.

12. The method of claim 10, wherein the first presentation of the virtual content appears to extend towards the vehicle from the first focal point and the updated presentation of the virtual content appears to extend towards the vehicle from the second focal point.

13. The method of claim 1, wherein the first physical object is a cross-street located ahead of the vehicle.

14. The method of claim 1, wherein the directional indicator is selected from an arrow, a shape, a 3d object, and a line.

15. The method of claim 1, wherein the directional indicator is an arrow.

16. The method of claim 1, further comprising:
generating a presentation of a second virtual content corresponding to the vehicle, the presentation of the second virtual content generated based on a distance between a user operating the vehicle and a front end of the vehicle; and
presenting the second virtual content on the transparent surface of the vehicle.

17. The method of claim 1, wherein the first physical object is visible through the transparent surface.

18. The method of claim 1, wherein the initial presentation of the virtual content and the updated presentation of the virtual content are provided at a display position on the transparent surface such that they appear to the user to overlap with the road on which the vehicle is operated.

19. The method of claim 1, wherein the transparent surface is a windshield of the vehicle.

20. An image-forming device incorporated into a vehicle, the image-forming device comprising:
one or more computer processors; and
one or more non-transitory computer-readable mediums storing instructions that, when executed by the one or more computer processors, cause the image-forming device to perform the method of claim 1.

21. A method for presenting content related to a destination to a user on a transparent surface of a vehicle, the method comprising:
identifying a first physical object and providing an initial distance of the first physical object from the vehicle at a first time;
gathering virtual content corresponding to the first physical object;
generating an initial presentation of the virtual content based on the initial distance of the first physical object from the vehicle, the virtual content being a directional indicator indicating a direction to a destination from the physical object;
presenting the initial presentation of the virtual content on the transparent surface of the vehicle, the virtual content presented at a position on the transparent surface corresponding to the first physical object;
determining an updated distance of the first physical object from the vehicle at a second time later than the first time;
generating an updated presentation of the virtual content based on the updated distance of the first physical object from the vehicle; and
presenting the updated presentation of the virtual content on the transparent surface of the vehicle.

* * * * *